US012592016B2

(12) United States Patent
Ellingson et al.

(10) Patent No.: US 12,592,016 B2
(45) Date of Patent: Mar. 31, 2026

(54) MATERIAL-SPECIFIC ATTENUATION MAPS FOR COMBINED IMAGING SYSTEMS

(71) Applicant: Siemens Medical Solutions USA, Inc., Malvern, PA (US)

(72) Inventors: Pierce Ellingson, Cincinnati, OH (US); Paul Schleyer, Knoxville, TN (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 512 days.

(21) Appl. No.: 18/054,583

(22) Filed: Nov. 11, 2022

(65) Prior Publication Data
US 2024/0161357 A1 May 16, 2024

(51) Int. Cl.
G06T 11/00 (2006.01)
(52) U.S. Cl.
CPC ........ G06T 11/008 (2013.01); G06T 2210/41 (2013.01)
(58) Field of Classification Search
CPC ......... A61B 6/037; A61B 6/032; A61B 5/055; A61B 6/5205; A61B 6/4417; A61B 6/482; A61B 6/5217; A61B 5/0035; A61B 6/5258; G06T 11/005; G06T 2207/10104; G06T 2211/424; G06T 11/008; G06T 2211/464; G06T 7/0012; G06T 7/11; G06T 2207/30004; G06T 2210/41; G06T 7/30; G06N 3/02; G16H 30/20
See application file for complete search history.

(56) References Cited

U.S. PATENT DOCUMENTS

| | | | | |
|---|---|---|---|---|
| 8,923,592 B2 * | 12/2014 | Wollenweber | ............ | G06T 5/50 |
| | | | | 382/131 |
| 9,311,707 B2 * | 4/2016 | Deller | .................. | A61B 6/4417 |
| 9,536,303 B2 * | 1/2017 | Traughber | ........... | G01R 33/481 |
| 9,619,905 B2 * | 4/2017 | Salomon | ................. | G06T 7/149 |
| 10,311,604 B2 * | 6/2019 | Zhu | ......................... | A61B 5/055 |
| 2006/0237652 A1 * | 10/2006 | Kimchy | ............... | G01R 33/481 |
| | | | | 600/407 |

OTHER PUBLICATIONS

Witoszynskyj, Stephan et al., "Attenuation correction of a flat table top for radiation therapy in hybrid PET/MR using CT- and 68Ge/68Ga transmission scan-based μ-maps", Physica Medica 65 (2019) 76-83.

(Continued)

*Primary Examiner* — Courtney Joan Nelson

(57) ABSTRACT

Systems and methods of generating an attenuation map are disclosed. Computed tomography (CT) scan data for a CT scan including an imaging component is obtained. The CT scan data comprises a plurality of voxels each having a scanned CT value. A material in each voxel of the plurality of voxels is identified by comparing the scanned CT value for the voxel with predetermined CT values for a plurality of materials and a voxel attenuation value for each voxel is determined based on the predetermined CT value for the identified material. An attenuation map including the determined voxel attenuation value for each voxel is generated. The attenuation map is configured for attenuation correction of an imaging modality including the imaging component with a field of view of the imaging modality.

10 Claims, 7 Drawing Sheets

(56) References Cited

OTHER PUBLICATIONS

Lerche, Christoph W. et al., "PET attenuation correction for rigid MR Tx/Rx coils from 176Lu background activity", Phys. Med. Biol. 63 (2018) 035039 (16pp).

Carney, Jonathan P. J. and Townsend, David W., "Method for transforming CT images for attenuation correction in PET/CT imaging", Med. Phys. 33 „4 . . . , Apr. 2006, 976-983.

Hofmann, Matthias et al., "MRI-Based Attenuation Correction for Whole-Body PET/MRI: Quantitative Evaluation of Segmentation- and Atlas-Based Methods", The Journal of Nuclear Medicine, vol. 52, No. 9, Sep. 2011, 1392-1399.

Oehmigen, Mark et al., "Improving the CT (140 kVp) to PET (511 keV) conversion in PET/MR hardware component attenuation correction", Med. Phys. 47 (5), May 2020, 2116-2127.

* cited by examiner

302 Obtain Plurality of CT Scans Including Imaging Element at Various Energy Levels 304 Generate Plurality of CT Maps 306 Generate Energy-Specific Material Maps 308 Generate Energy-Specific Attenuation Map 310 Generate Final Material-Specific Attenuation Map 110 Register Material-Specific Attenuation Map 112 Perform Attenuation Correction

300

MATERIAL-SPECIFIC ATTENUATION MAPS FOR COMBINED IMAGING SYSTEMS

FIELD

This disclosure generally relates to systems and methods for generating attenuation maps for computed tomography.

BACKGROUND

Combination imaging systems combine two or more imaging modalities into a single machine or location. Current combined modalities can include a magnetic resonance (MR) imaging (MRI) modality in conjunction with positron emission tomography (PET) imaging modality, a computer tomography (CT) modality in conjunction with a PET modality, an MRI, PET, and CT combined modality, or other combinations. When combining imaging modalities, imaging systems must include hardware for each of the different imaging modalities.

When integrated into a system including a PET imaging modality, MR hardware causes attenuation within the PET field of view (FOV). Current systems utilize a CT-based attenuation correction (CTAC) that employs a linear scaling factor to arrive at attenuation (p) values for PET attenuation correction. The scaling factor is applied piecewise and includes a discontinuity, which is set to ~500 Hounsfiled Units (HU), to differentiate between soft-tissue and bone, which is the same method used for generating p-maps ("attenuation maps") in PET/CT combined scans. The current CTAC system does not perform well with respect to non-organic materials. In addition, current systems require point sources attached to hardware elements to provide targets for spatial orientation of the attenuation values.

SUMMARY

In various embodiments, a method of generating an attenuation map is disclosed. The method includes a step of receiving computed tomography (CT) scan data for a CT scan including an imaging component. The CT scan data comprises a plurality of voxels each having a scanned CT value. The method further includes the steps of identifying a material in each voxel of the plurality of voxels by comparing the scanned CT value for the voxel with predetermined CT values for a plurality of materials, determining a voxel attenuation value for each voxel based on the predetermined CT value for the identified material, and generating an attenuation map including the determined voxel attenuation value for each voxel. The attenuation map is configured for attenuation correction of an imaging modality including the imaging component with a field of view of the imaging modality.

In various embodiments, a system is disclosed. The system includes a first imaging modality having at least one imaging component, a second imaging modality, and a processor. A field of view of the second imaging modality includes the at least one imaging component of the first imaging modality. The processor is configured to receive computed tomography scan data including the at least one imaging component. The CT scan data comprises a plurality of voxels each having a scanned CT value. The processor is further configured to identify a material in each voxel of the plurality of voxels by comparing the scanned CT value for the voxel with predetermined CT values for a plurality of materials, determine a voxel attenuation value for each voxel based on the predetermined CT value for the identified material, generate an attenuation map including the determined voxel attenuation value for each voxel, receive imaging data from the second imaging modality, generate attenuation-corrected data by correcting the imaging data based on the attenuation map, and reconstruct an image from the attenuation-corrected data.

In various embodiments, a method of registering an attenuation map is disclosed. The method includes a step of receiving an attenuation map in a first coordinate system. The attenuation map includes at least one imaging component. The method further includes a step of receiving a lutetium oxyorthosilicate (LSO) radiation scan data for a registration scan in a second coordinate system. The LSO radiation scan includes the at least one imaging component in an installed position of the LSO radiation scan. The method further includes a step of registering a position of the at least one imaging component in the attenuation map to a position of the at least one imaging component in the installed position of the LSO radiation scan.

BRIEF DESCRIPTION OF THE DRAWINGS

The features and advantages of the present invention will be more fully disclosed in, or rendered obvious by the following detailed description of the preferred embodiments, which are to be considered together with the accompanying drawings wherein like numbers refer to like parts and further wherein.

DETAILED DESCRIPTION

This description of the exemplary embodiments is intended to be read in connection with the accompanying drawings, which are to be considered part of the entire written description.

In the following, various embodiments are described with respect to the claimed systems as well as with respect to the claimed methods. Features, advantages or alternative embodiments herein can be assigned to the other claimed objects and vice versa. In other words, claims for the systems can be improved with features described or claimed in the context of the methods. In this case, the functional features of the method are embodied by objective units of the systems.

Furthermore, in the following, various embodiments are described with respect to methods and systems for generating a material-specific attenuation map for an integrated imaging system having two imaging modalities: a first imaging modality and a second imaging modality. The two imaging modalities can be, for example, an MRI imaging modality and a PET imaging modality.

The material-specific attenuation map includes voxel attenuation values based on the material composition of the voxel. One or more CT scans can be obtained of one or more imaging elements of the first imaging modality system that, when installed in a combined imaging system, cause attenuation within a field-of-view (FOV) of the second imaging modality system. For example, the one or more imaging elements can include an MR imaging coil configured to be installed in a combined MRI/PET imaging system within the FOV of the PET imaging modality. Based on the CT scan, a material type is determined for each voxel and an attenuation value is determined for the corresponding material. An attenuation value, p, can be calculated for each voxel based on an attenuation value of the identified material and a percentage of the voxel occupied by the material. The calculated attenuation values for each voxel form an attenuation map for the second imaging modality of the combined imaging system.

The disclosed systems and methods are particularly suited to generating attenuation maps for arbitrary, e.g., custom MR hardware and/or phantoms. The accuracy of the thus generated attenuation map (e.g., p-map) is much higher than attenuation maps generated using the prior art linear piecewise process. In some embodiments, the attenuation value is based on the expected energy of the CT scan used to generate the initial scan of the field of view, and the accuracy of the attenuation values increases as the accuracy of the CT scan increases. The use of the disclosed systems and methods can also provide better attenuation correction when non-organic materials are present in a patient, such as, for example, metal implants, dental fillings, etc.

Figure 1:
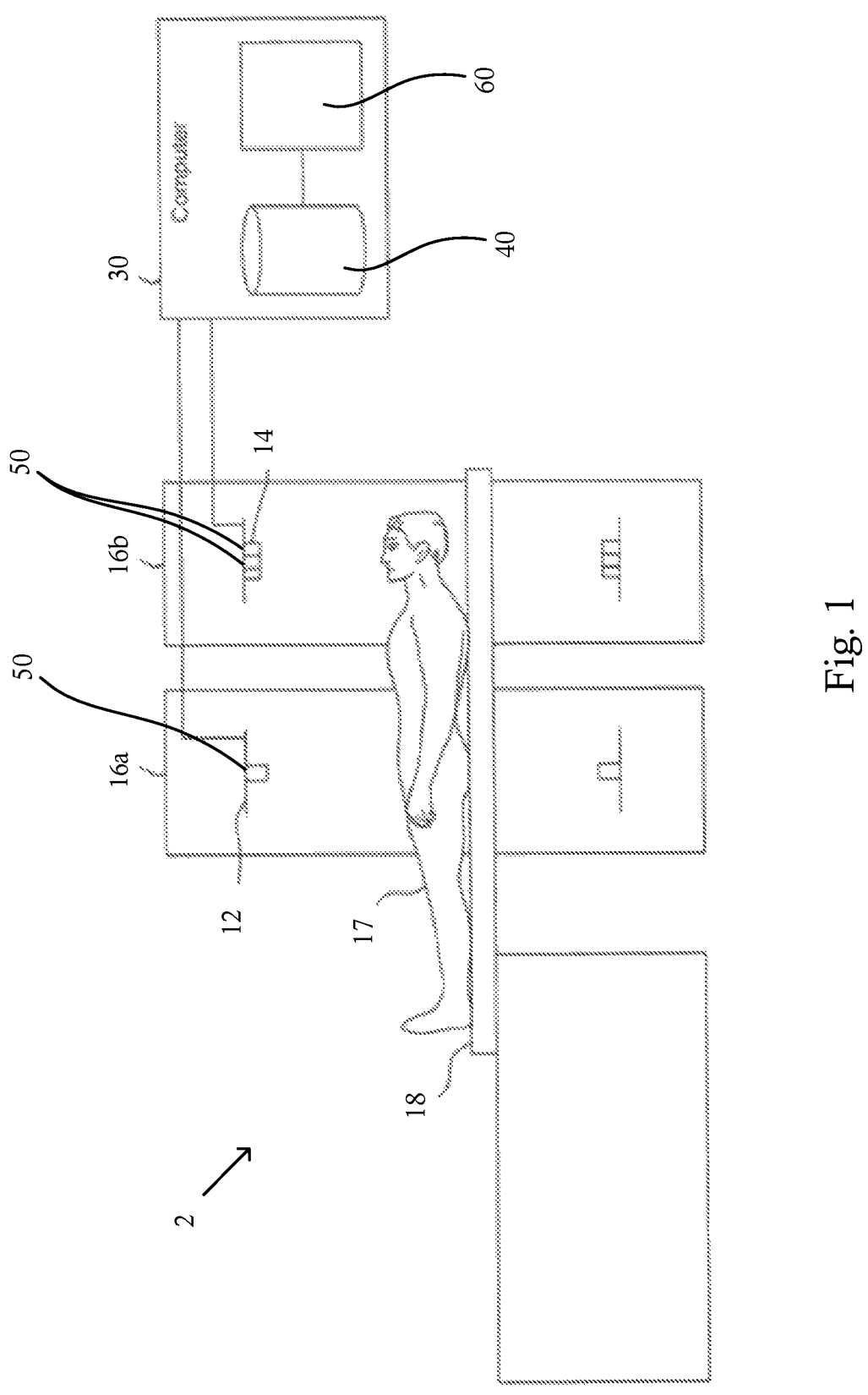
FIG. 1 illustrates an imaging system, in accordance with some embodiments.

FIG. 1 illustrates one embodiment of a nuclear imaging system 2, in accordance with some embodiments. The nuclear imaging system 2 includes a scanner for at least a first modality 12 provided in a first gantry 16a. The first modality 12 can include any suitable imaging modality, such as a positron emission tomography (PET) modality. A patient 17 lies on a movable patient bed 18 that can be movable within a gantry 19. In some embodiments, the nuclear imaging system 2 includes a scanner for a second imaging modality 14 provided in a second gantry 16b. The second imaging modality 14 can be any suitable imaging modality, such as, for example, a magnetic resonance imaging (MRI) modality. Although embodiments are discussed herein including an MRI modality, it will be appreciated that any suitable modality configured to provide sufficient soft tissue contrast and spatial resolution can be used. Each of the first modality 12 and/or the second modality 14 can include one or more detectors 50 configured to detect an annihilation photon, gamma ray, and/or other nuclear imaging event.

Scan data from the first modality 12 and/or the second modality 14 is stored at one or more computer databases 40 and processed by one or more computer processors 60 of a computer system 30. The graphical depiction of computer system 30 in FIG. 1 is provided by way of illustration only, and computer system 30 can include one or more separate computing devices. The nuclear imaging data sets can be provided by the first modality 12, the second modality 14, and/or can be provided as a separate data set (e.g., reconstructed image(s), list mode data set(s), raw data, etc.), such as, for example, from a memory coupled to the computer system 30. The computer system 30 can include one or more processing electronics for processing a signal received from one of the plurality of detectors 50.

In some embodiments, the computer system 30 is configured to generate reconstructed images based on image data from the first modality 12 and image data from the second modality 14. For example, in some embodiments, the computer 30 is configured to generate reconstructed images based on PET imaging data and MRI imaging data. The obtained image data can be acquired sequentially and/or at least partially simultaneously. The reconstructed images can be generated using an iterative reconstruction process including an adaptive hyperparameter (i.e., an adaptive prior strength parameter).

Figure 2:
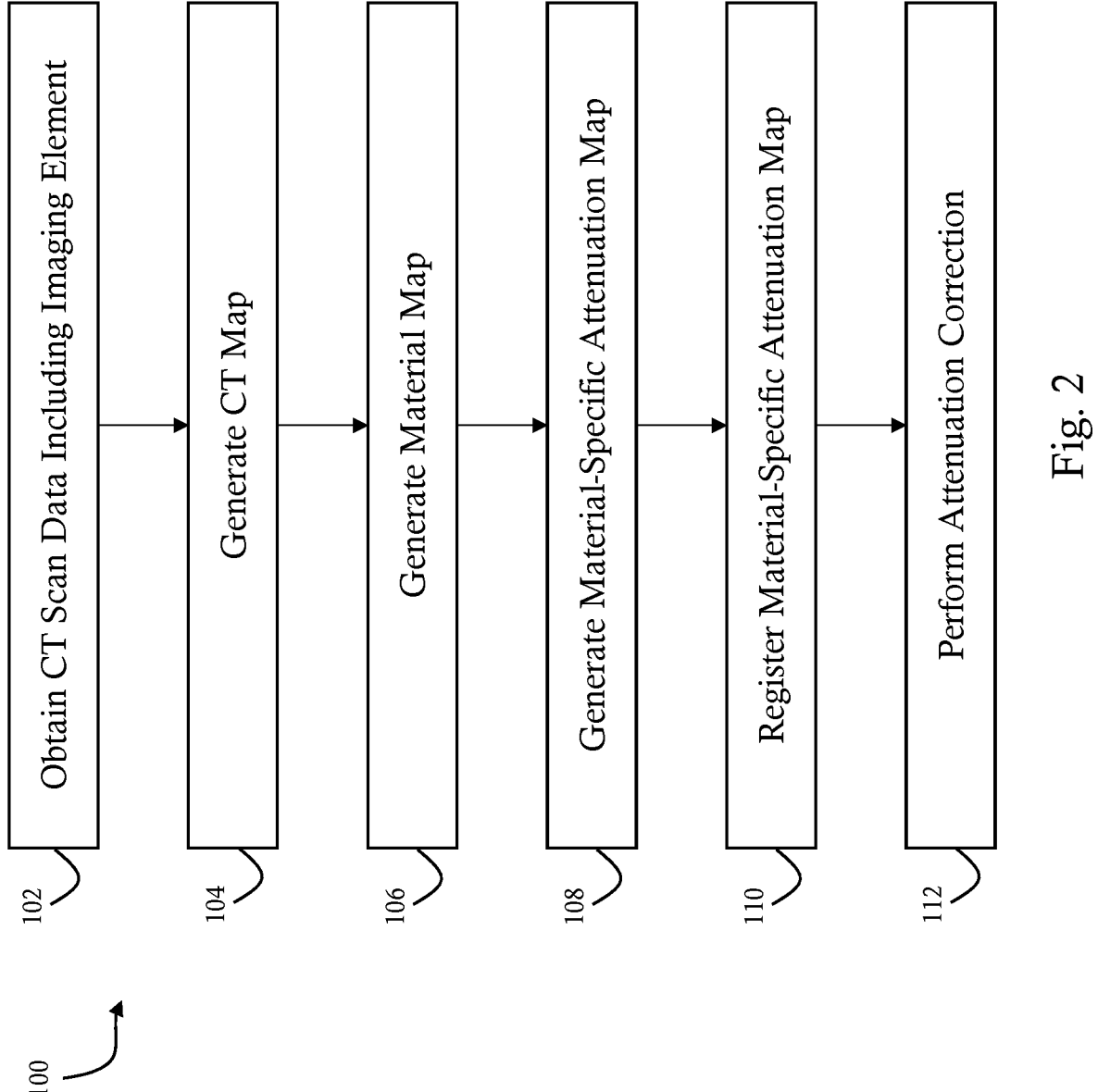
FIG. 2 is a flowchart illustrating a method of generating a material-specific attenuation map, in accordance with some embodiments.
Figure 3:
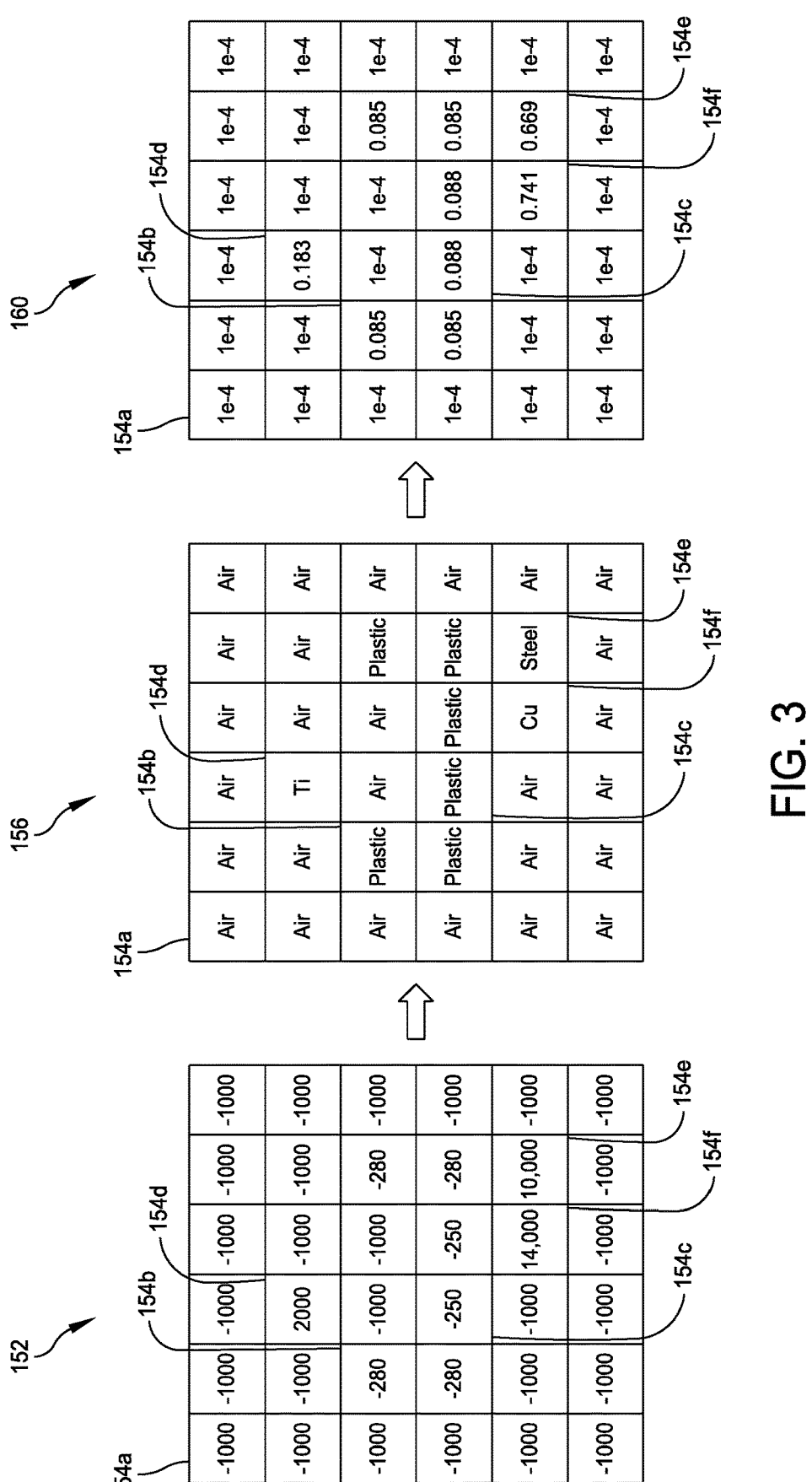
FIG. 3 is a process flow illustrating various steps of the method of generating a material-specific attenuation map, in accordance with some embodiments.

FIG. 2 is a flowchart 100 illustrating a method of generating a material-specific attenuation map, in accordance with some embodiments. FIG. 3 is a process flow 150 illustrating various steps of the method of generating a material-specific attenuation map, in accordance with some embodiments. Referring to the flowchart 100, at step 102, CT scan data for one or more imaging elements associated with a first imaging modality in a combined imaging system is obtained. For example, in some embodiments, a first imaging modality is an MR imaging modality and one or more imaging elements (e.g., the hardware components) of the MR imaging modality that are configured to be installed in a combined MRI/ PET imaging system is received. The CT scan data can be obtained by performing a CT scan of the MR imaging elements using a separate CT modality prior to installation of the MR imaging modality imaging elements. Alternatively, the CT scan data can be obtained by performing a CT scan of the MR imaging elements using an integrated CT scanning modality (i.e., integrated into the MRI/PET imaging system). Further alternatively, the CT scan data can be obtained using both a separate CT modality and an integrated CT scan modality. The CT scan data can be obtained simultaneous with the CT scan or after the CT scan has been performed. The CT scan data can be obtained directly from the CT modality and/or can be obtained from a memory unit.

Although embodiments are discussed herein including one or more imaging elements of a first imaging modality, it will be appreciated that the disclosed systems and methods can be used to generate material-specific attenuation maps of other materials, such as, for example, phantom, patients, etc. For example, in some embodiments, a CT scan can be obtained of a custom phantom having different materials. A material-specific attenuation map can be generated for the custom phantom as described below, with the CT imaging being performed on the custom phantom instead of or in addition to the one or more imaging elements. It will appreciated that the disclosed material-specific attenuation maps can be used for attenuation correction of any system, including single modality systems, combined modality systems, and/or any other suitable systems.

At step 104, a CT map 152 is generated based on the CT reading values of the CT scan data. The CT map 152 illustrates the FOV of the performed scan area and includes various scanned CT values based on the quantity and type of material included in each voxel of the scan. The CT map 152 includes a mapping of the scanned CT values to the corresponding voxel. For example, and without limitation, as illustrated in FIG. 3, a first voxel 154a can have a scanned CT value of −1000 HU, a second voxel 154b can have a scanned CT value of −280 HU, a third voxel 154c can have a scanned CT value of −250 HU, a fourth voxel 154d can have a scanned CT value of 2000 HU, a fifth voxel 154e can have a scanned CT value of 10,000 HU, and a sixth voxel 154f can have a scanned CT value of 14,000 HU (collectively with the other voxels referred to as "voxels 154" herein). Although embodiments are shown with a square CT map 152 for simplicity, it will be appreciated that the CT map 152 can take any suitable two-dimensional and/or three-dimensional shape. In addition, although the illustrated CT map 152 includes 36 separate voxels 154, only six specific voxels 154a-154f are discussed herein. It will be appreciated that any disclosure provided with respect to one voxel is similarly applicable to any other corresponding voxel.

In some embodiments, the CT map 152 can be generated by a photon-counting CT system. A photon-counting CT system is configured to count each charge created by an individual x-ray photon and measure the respective energy level, providing intrinsic spectral sensitivity in each CT scan. Photon-counting CT systems can be more dose efficient than solid-state scintillation systems and can provide smaller pixels, potentially increasing the spatial resolution of a scan. In photon-counting CT systems, the disclosed method of generating an attenuation map can be performed on a per-pixel basis. By performing the disclosed methods on a per-photon basis, the generated CT scan allows an attenuation map to be generated based on the material encountered by each individual photon, providing higher-resolution with respect to material locations within the system. It will be appreciated that references herein to "voxels" apply equally to individual photons when a photon-counting CT system is employed.

At step 106, a material map 156 is generated by mapping each of the voxels in the CT map 152 to a predetermined material. In some embodiments, a material mapping is performed by selecting a material from a set of materials for each voxel based on the scanned CT value for that voxel. The scanned CT value for a voxel can be compared to predetermined CT values for each material in a set of materials. For example, in some embodiments, if a voxel has a scanned CT value lower than or equal to the CT value of a material in the set of materials, the voxel can be assigned the corresponding material.

In some embodiments, the CT value for a material is a maximum expected, or ceiling, CT value for that material. For example, a first material can have a maximum CT value of −1000 HU, a second material can have a maximum CT value of −250 HU, a third material can have a maximum CT value of 2,000 HU, a fourth material can have a maximum CT value of 10,000 HU, a fifth material can have a maximum CT value of 14,000 HU, etc. If a first voxel 154a as shown in the CT map 152 has a value of −1,000 HU, the first voxel 154a is identified as the first material. Similarly, if a second voxel 154b has a value of −280 HU, the second voxel 154b is identified as the second material. The maximum CT values for each material can be determined empirically (e.g., based on scans of each material obtained in isolation) and/or analytically (e.g., based on a well-characterized CT spectrum).

Each voxel can be checked against the predetermined CT value of each material in the set of materials sequentially and/or simultaneously. For example, in some embodiments, the scanned CT value for each voxel can be compared to the predetermined CT value for each material in the set of materials sequentially, beginning with the material having the highest predetermined CT value and proceeding to the material having the lowest predetermined CT value. Continuing from the example above, sequential comparison can be performed by comparing a scanned CT value of a voxel to the predetermined CT value of the sixth material, e.g., 14,000 HU and proceeding in descending order to the predetermined CT value of the first material, e.g., −1,000 HU.

In some embodiments, a single voxel can be sequentially identified as different materials. For example, in first iteration, a first voxel 154a and a second voxel 154b can each be compared to a material having a predetermined CT value of −250 HU (e.g., the second material). Both the first voxel 154a and the second voxel 154b have a CT value that is less than or equal to the predetermined CT value of the second material (e.g., −1000 HU and −250 HU, respectively), and therefore are identified as the second material. During a subsequent comparison iteration, the first voxel 154a and the second voxel 154b are each compared to a material having a predetermined CT value of −1000 HU (e.g., the first material). The first voxel 154a has a scanned CT value that is less than or equal to the predetermined CT value of the first material (e.g., −1000 HU) and is identified as the first material. However, the second voxel 154b has a scanned CT value that is greater than the predetermined CT value for the first material (e.g., −250 HU), and therefore is not identified as the first material. Instead, the second voxel 154b retains the prior identification of the second material.

As another example, in some embodiments, the scanned CT value of each voxel in a CT map 152 is compared to each of the predetermined CT values for each material in the set of materials simultaneously. The scanned CT value of a first voxel 154a can be compared to a set of ranges defined by the predetermined (e.g., maximum) CT values of the materials to determine the correct material identification. Using the previously discussed set of materials, the ranges can be defined, for example, as:

First Material: $X < −1,000$ HU
Second Material: $−1,000$ HU $< X < −250$ HU
Third Material: $−250$ HU $< X < 2,000$ HU
Fourth Material: $2,000$ HU $< X < 10,000$ HU
Fifth Material: $10,000$ HU $< X < 14,000$ HU Although specific embodiments are discussed herein, it will be appreciated that the ranges can be set to be any suitable range of overlapping and/or non-overlapping values. In addition, it will be appreciated that comparison of the scanned CT values to the predetermined CT values for the set of materials can be performed using any suitable comparison configured to assign a specific material to each of the voxels based on the scanned CT values.

Continuing the example from above, as shown in FIG. 3, the CT map 152 includes voxels having various scanned CT values, including: a first voxel 154a at −1000 HU, a second voxel 154b at −280 HU, a third voxel 154c at −250 HU, a fourth voxel 154d at 2000 HU, a fifth voxel 154e at 10,000 HU, and a sixth voxel 154f at 14,000 HU. Using either the sequential or simultaneous mapping discussed above, a material map 156 can be generated including a first voxel 154a mapped to a first material (e.g., air), a second voxel 154b and a third voxel 154c each mapped to a second material (e.g., plastic), a fourth voxel 154d mapped to a third material (e.g., titanium), a fifth voxel 154e mapped to a fourth material (e.g., steel), and a sixth material 154f mapped to a sixth material (e.g., copper). Although specific materials are identified for illustration purposes, it will be appreciated that any suitable materials can be used with corresponding predetermined CT values.

Figure 4:
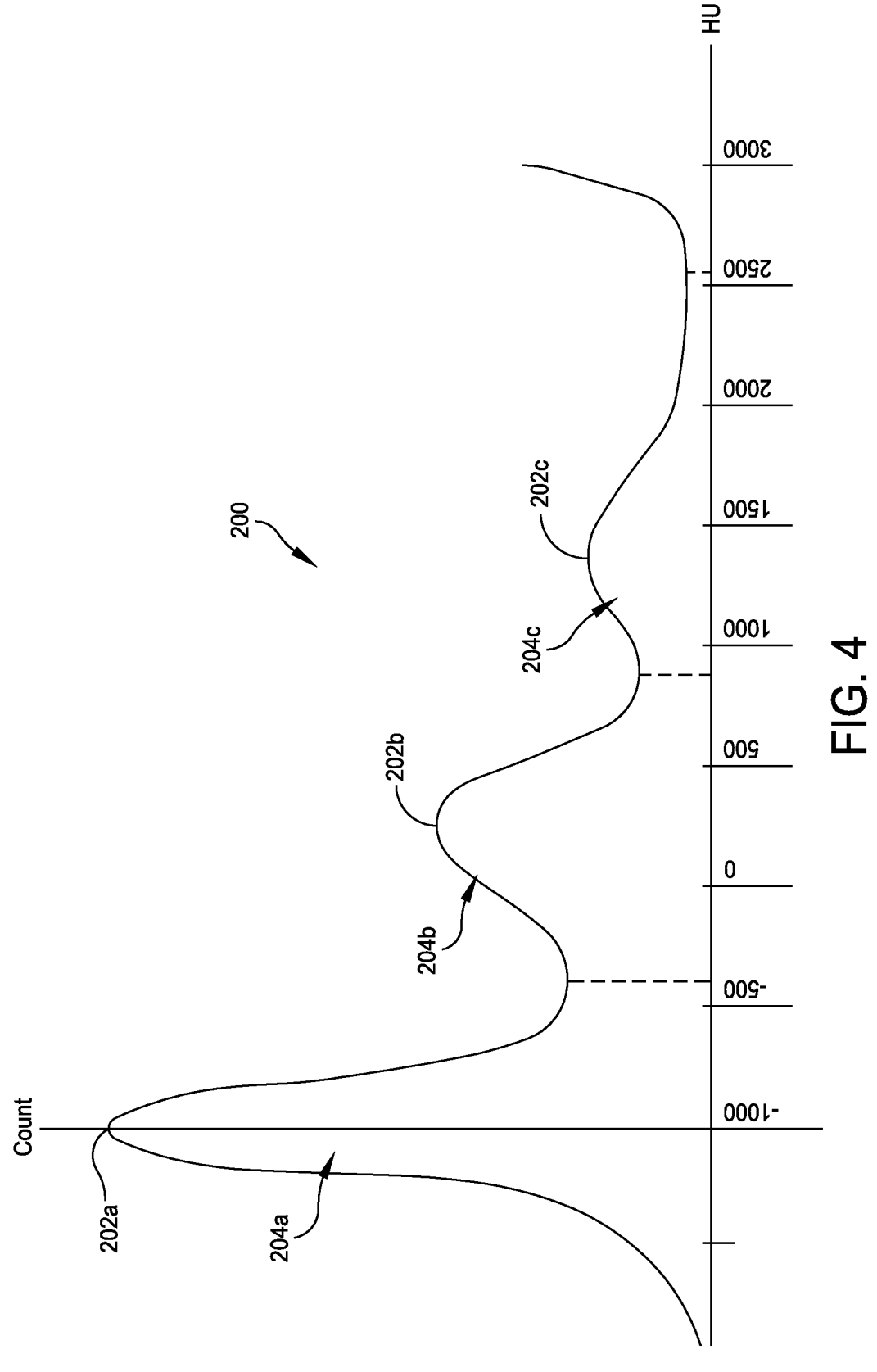
FIG. 4 is a chart illustrating a distribution of CT scan values over various materials, in accordance with some embodiments.

In some embodiments, material identification for one or more voxels can be based on a comparison with a local maximum CT value generated from a distribution of CT values. For example, CT readings of MR imaging modality's imaging elements (the MR hardware) can vary due to differences in CT spectrum (e.g., shape and characterization of CT spectrum), calibration, and/or detector efficiencies. To compensate for this variability, a voxel can be assigned a material identification when the scanned CT value is within a certain distance of a maximum CT value for an identified material within a distribution. For example, as shown in FIG. 4, a distribution 200 of CT scan values over various materials can include defined local maximum 202a, 202b, and 202c, each having a distribution of values within a corresponding portion 204a, 204b, and 204c of the distribution 200. If a scanned CT value is within a corresponding portion 204a, 204b, and 204c of the distribution, the material for that scanned CT value is determined to be the material corresponding to the local maximum 202a, 202b, and 202c. The corresponding portions can be defined empirically and/ or can be estimated as Gaussian distributions, Laplace distributions, and/or any other suitable distribution. In some embodiments, the defined distributions can be used to identify multi-material voxels by extrapolating a distribution into overlapping regions and fitting the local maximum to those distributions within the multi-material voxel.

At step 108, a material-specific attenuation (μ) map 160 is generated by calculating voxel-specific attenuation values for each voxel. In some embodiments, a predetermined linear attenuation coefficient can be assigned for the identified material. In other embodiments, the voxel-specific attenuation values can be calculated based on a ratio between the scanned CT value and the predetermined CT value of the material identified for the voxel. In some embodiments, this ratio is representative of the percentage of the voxel occupied by the identified material. For example, a voxel-specific attenuation value ($\mu_{voxel}$) can be calculated as:

$$\mu_{voxel} = \mu_{PET} \times \frac{\mu_{CT\,scanned}}{\mu_{CT\,material}}$$

where $\mu_{PET}$ is a predetermined linear attenuation coefficient for the selected material at an expected energy, $\mu_{CT\,scanned}$ is the scanned CT value for the voxel, and $\mu_{CT\,material}$ is the predetermined CT value for the identified material. In some embodiments, $\mu_{PET}$ is scaled with a linear function of the scanned CT value and the predetermined CT value, although it will be appreciated that any non-linear function can be used. The voxel-specific attenuation value is assigned to the corresponding voxel to generate a machine-specific attenuation map 160.

In some embodiments, the material-specific attenuation map 160 can include a first set of voxels having attenuation values generated using the method illustrated in FIG. 2 and a second set of voxels having attenuation values generated using a traditional piecewise linear process. For example, in some instances, the material of a voxel may not be determined, such as if the voxel has an attenuation value close to two different materials or not within any defined range for material identification. When a material is identified for a voxel, the disclosed material-specific method can be applied. However, when a material cannot be identified for a voxel, a piecewise linear process can be applied for that voxel to generate an attenuation value, as is known in the art. The resulting attenuation map will include voxels having higher accuracy voxels where a material is identified (based on the disclosed material-specific method disclosed herein) and lower-accuracy voxels where a material is not identified.

In some embodiments, one or more image recognition processes can be applied to identify the position and/or the percentage of a material within a voxel. For example, in various embodiments, machine learning processes, such as clustering processes, can be applied to identify materials and elements within a CT scan. A clustering process can be applied, for example, to draw shapes within a CT scan that identify singular units of a material or component. Any suitable clustering process, such as k-means or hierarchical clustering, and/or any other suitable machine learning process can be applied to identify edges and locations of materials within a CT scan.

The location and edges of elements or shapes within a CT scan assist in the identification of percentage of a material within a voxel and/or allow for identification of multi-material voxels, e.g., voxels containing a combination of materials having different HU values. In some embodiments, a voxel-specific attenuation value can be calculated based on percentages of materials within the voxel identified based on clustering or other machine learning processes. In some embodiments, image recognition processes can be combined with photon-counting CT systems to provide highly accurate identification of materials within a CT scan, providing photon-accurate attenuation maps for use in subsequent imaging.

At step 110, the material-specific attenuation map 160 is mapped or registered to the coordinate system of the second imaging modality. As discussed in greater detail below, registration of the material-specific attenuation map 160 can be performed by registering a position of the one or more imaging elements in the material-specific attenuation map 160 to the position of the one or more imaging elements in a registration scan performed after the one or more imaging elements are installed in the combined system.

At step 112, attenuation correction can be performed on imaging data obtained by the second imaging modality. For example, in some embodiments, the second imaging modality is a PET imaging modality and the material-specific attenuation map is used for attenuation correction of PET imaging data during and/or after an PET imaging procedure. Although specific embodiments are discussed herein, it will be appreciated that the material-specific attenuation map can be used for attenuation correction in any suitable imaging procedure in single and/or combined modality systems.

Figure 5:
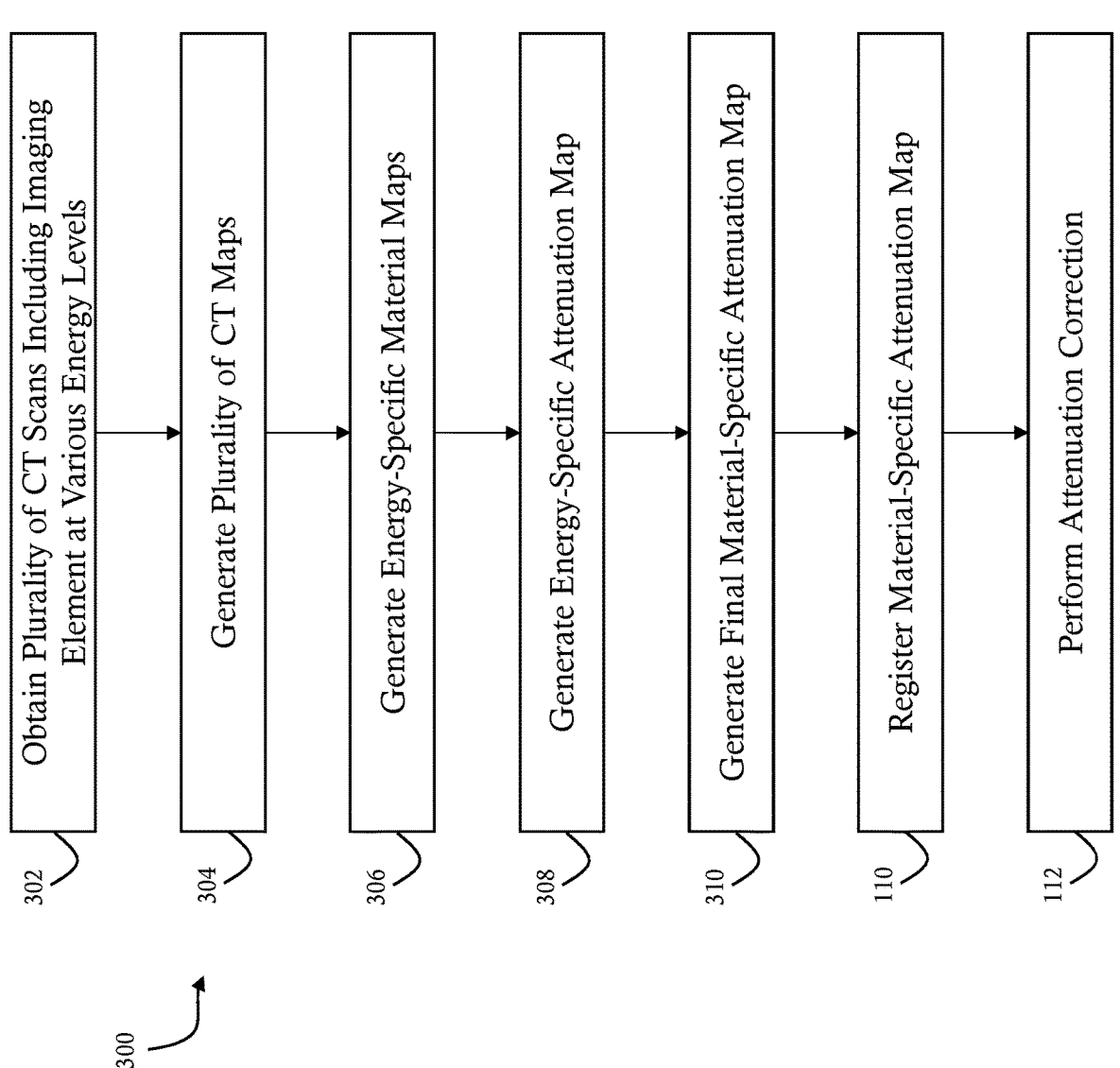
FIG. 5 is a flowchart illustrating a method of generating a material-specific attenuation map using a multi-energy and/or diverse spectra CT scan process, in accordance with some embodiments.

FIG. 5 is a flowchart 300 illustrating a method of generating a material-specific attenuation map using a multi-energy and/or diverse spectra CT scan process, in accordance with some embodiments. The method of generating a material-specific attenuation map using a multi-energy and/ or diverse spectra CT scan process is similar to the method of generating a p-map based on specific materials in a field of view, discussed above with respect to FIGS. 2 and 3, and similar description is not repeated herein.

In some embodiments, at step 302, multiple CT scans of portions of a system that includes overlapping MRI hardware within a PET FOV can be obtained at different CT energy levels. Each of the CT scans includes at least partially overlapping FOV, e.g., each includes at least a portion of the overlapping MRI hardware within the PET FOV. The CT scans can be obtained using any suitable process, such as, for example, obtaining multiple scans using a single CT scanning modality at multiple energy levels and/or utilizing different CT scanning modalities each at a different energy level. For example, dual energy methods are a well-known feature in commercially available CT scanners. It will be appreciated that any number of CT scans at different energies can be obtained.

At step 304 multiple CT scan maps are generated and, at step 306, energy-specific material maps are generated for each CT scan (e.g., at each energy level) as discussed above with respect to steps 104-106 of FIG. 2. It will be appreciated that the predetermined CT values for each material in the set of materials will vary based on the energy level of the respective CT scan. The CT values of each CT scan are compared to the predetermined CT values of the set of materials for the corresponding energy level to generate each material map.

At step 308, an energy-specific attenuation map is generated for each energy-specific material map generated at step 306 (e.g., generated for each CT energy level in the set of CT scans). The energy-specific attenuation maps are material-specific attenuation maps generated in a similar manner as discussed with respect to step 108 of FIG. 2. At step 310, a final material-specific attenuation map is generated by combining the attenuation values of a voxel in each of the energy-specific attenuation maps. For example, in some embodiments, a final attenuation value is calculated by averaging each of the individual attenuation values for a voxel in each of the energy-specific attenuation maps. It will be appreciated that any suitable method of combining the attenuation values can be used. For example, and without limitation, the attenuation values can be combined based on averages, means, modes, weighted calculations, and/or any other suitable combination. The method 300 proceeds to step 110 as discussed above with respect to FIG. 2.

It will be appreciated that the multiple CT scan maps and/or energy-specific attenuation maps can be combined using any suitable method. For example, as discussed above, energy-specific attenuation maps can be generated for each CT map and a final material-specific attenuation map generated by combining the attenuation values at each voxel. As another example, in some embodiments, the CT maps can be combined into a single map and the final attenuation map can be generated directly from the combined CT map. It will be appreciated that combing the CT maps prior to generating the energy-specific attenuation maps requires scaling of the various CT values based on the energy of the underlying CT scan.

Figure 6:
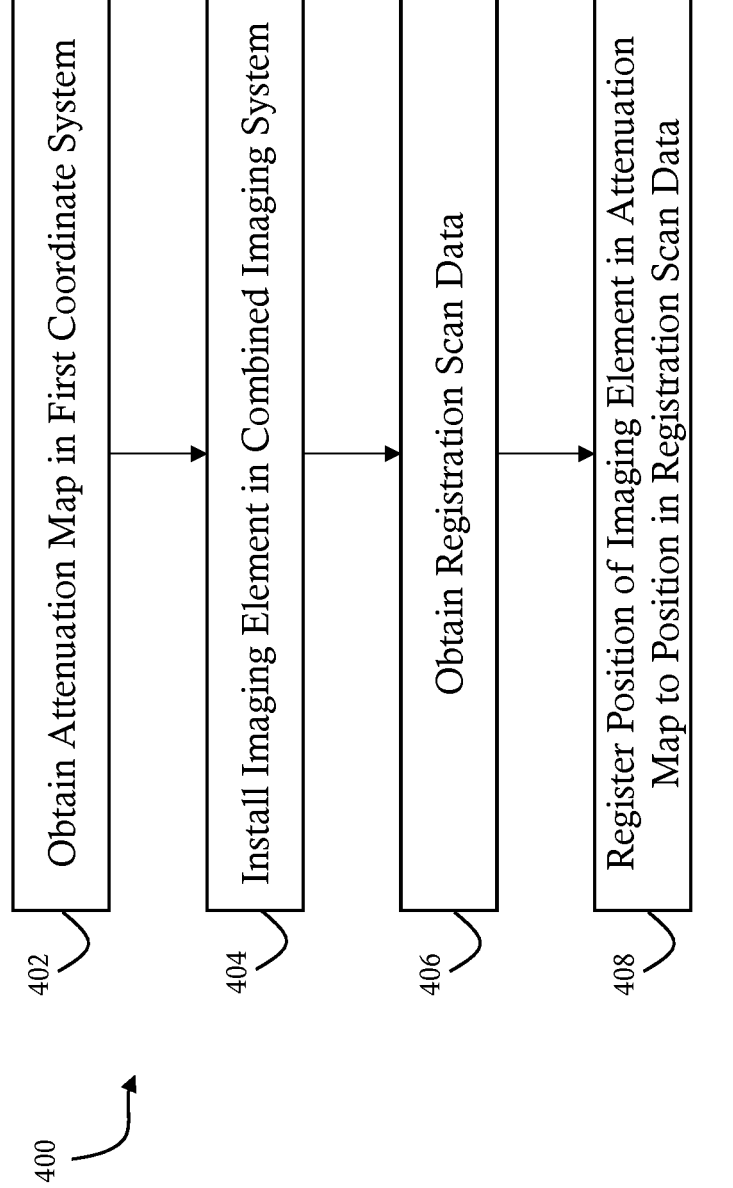
FIG. 6 is a flowchart illustrating a method of mapping an attenuation map in a first coordinate system to a second coordinate system, in accordance with some embodiments.

In some embodiments, an attenuation map, such as a material-specific attenuation map as discussed above, is generated in a first coordinate system, such as a coordinate system of the CT system. In order to be used for attenuation correction during a scan, such as a PET scan, the attenuation map can be transformed from the first coordinate system to a second coordinate system. For example, an attenuation map can be mapped (or converted) from a first coordinate system corresponding to a CT scan to a second coordinate system of a PET imaging modality in a combined MRI/PET system. FIG. 6 is a flowchart 400 illustrating a method of registering an attenuation map from a first coordinate system to a second coordinate system, in accordance with some embodiments.

At step 402, an attenuation map including at least one imaging element associated with a first imaging modality is obtained. The attenuation map is in a first coordinate system. The attenuation map can be generated according to any suitable process, such as, for example, the method of generating a material-specific attenuation map discussed herein and/or other known attenuation map generation processes. Although embodiments are discussed with respect to the disclosed material-specific attenuation maps, it will be appreciated that the method of registering an attenuation map illustrated in FIG. 6 can be used for attenuation maps generated using any suitable process.

The attenuation map includes at least one imaging element of a first imaging modality, such as an MRI coil or other imaging element, that is configured to be positioned within a FOV of a second imaging modality in a combined system, such as a PET imaging modality in a combined MRI/PET imaging system. At step 404, the at least one imaging element of the first imaging modality is installed in the combined imaging system at a predetermined location that overlaps with the FOV of the second imaging modality, for example, positioning an MRI coil within the FOV of a PET imaging modality in a combined MRI/PET imaging system.

At step 406, registration scan data is obtained for the second imaging modality in the combined system. For example, in some embodiments, a registration scan can be performed using the second imaging modality. The registration scan can include any suitable scan, such as, for example, an active scan and/or a passive scan. In some embodiments, the registration scan is a lutetium oxyorthosilicate (LSO) background radiation scan, although it will be appreciated that any suitable scan can be performed. The registration scan includes the imaging element of the first imaging modality within the FOV. In some embodiments, the registration scan can be performed simultaneously with additional scans, such as a scan of patient using the second imaging modality. For example, in some embodiments, a PET scan of patient can be performed simultaneously with the LSO background radiation scan. The LSO background radiation scan can be used for registration of a previously generated attenuation map, which can then be used for attenuation correction of the PET scan of the patient.

The term "registration" is used throughout this disclosure for registering the attenuation map with the LSO transmission image but that process is also referred to by many in the art as "alignment."

At step 408, registration is performed between the attenuation map and the registration scan based on the position of the at least one imaging element associated with the first imaging modality. In some embodiments, body registration, such as rigid body registration, between the imaging element within the registration scan obtained by the second imaging modality and the imaging element in the attenuation map is performed to map the attenuation map to the true coordinate system of the second imaging modality. Although embodiments are discussed herein including rigid body registration, it will be appreciated that non-rigid body registration and/or other forms of registration can be used to map the attenuation map to the registration scan.

The disclosed registration method illustrated in FIG. 6 provides an automated mechanism for an externally developed attenuation map to be used on a combined imaging modality system, such as a combined MR/PET system. The automated method eliminates the need to attach point sources to approximate locations on hardware and can be used to register in-house generated attenuation maps of phantoms or system As discussed above, in some embodiments, the registration scan can be performed with a patient within the FOV of the second imaging modality. For example, a PET scan of a patient can be performed simultaneously with a LSO background radiation scan for registration. As another example, an LSO background radiation scan can be performed independently with a patient located within the FOV of a PET imaging modality. When a patient is present in the FOV, registration of the attenuation map to the coordinate system of the second imaging modality provides patient-specific alignment of the attenuation map. Because the location of the patient relative to the at least one imaging element of the first imaging modality is included in the registration scan, alignment of the attenuation map to the registration scan similarly results in alignment of the attenuation map to the patient.

In some embodiments, both the CT scan and the registration scan can be performed with a patient in a FOV of the imaging modalities. For example, in some embodiments, a patient can be placed on a fixed support table with the at least one imaging element of the first imaging modality. A CT scan can be performed that includes both the patient and the at least one imaging element. The material-specific attenuation map generated by the disclosed method will include attenuation values for voxels containing the patient, providing patient-specific attenuation values in addition to attenuation values for the at least one imaging component of the first imaging modality. Subsequently, the at least one imaging component is installed in a combined MRI/PET imaging system and a registration scan is performed that includes both the at least one imaging component and the patient. The attenuation map is registered to the coordinate system of the registration scan, providing both component-specific and patient-specific attenuation values.

Embodiments including a patient within a FOV of the CT scan provide for higher-accuracy attenuation maps for the patient. For example, if the patient includes non-organic materials, such as metal implants, dental fillings, joint replacements, etc., those non-organic materials can be identified using the material-specific method discussed above and accurate attenuation values applied to voxels containing the non-organic materials can be generated. Similarly, although embodiments are discussed herein regarding non-organic materials, it will be appreciated that material-specific attenuation mapping process disclosed herein can be used to generate attenuation values for organic materials, either separately or in addition to the non-organic materials.

Figure 7:
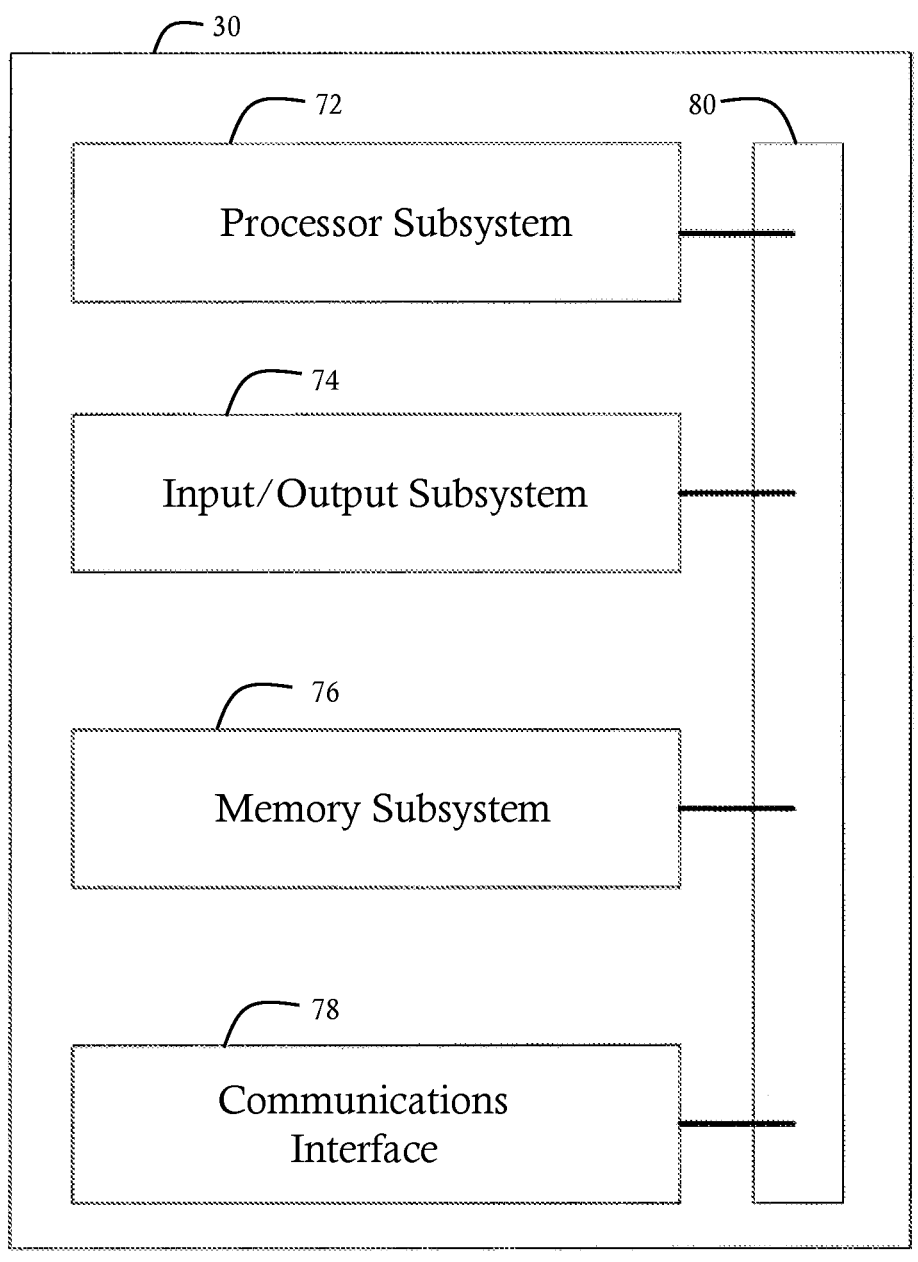
FIG. 7 illustrates a computer system configured to implement one or more processes, in accordance with some embodiments.

FIG. 7 illustrates a computer system 30 configured to implement one or more processes, in accordance with some embodiments. The system 30 is a representative device and can include a processor subsystem 72, an input/output subsystem 74, a memory subsystem 76, a communications interface 78, and a system bus 80. In some embodiments, one or more than one of the system 30 components can be combined or omitted such as, for example, not including an input/output subsystem 74. In some embodiments, the system 30 can comprise other components not shown in FIG. 10. For example, the system 30 can also include, for example, a power subsystem. In other embodiments, the system 30 can include several instances of a component shown in FIG. 10. For example, the system 30 can include multiple memory subsystems 76. For the sake of conciseness and clarity, and not limitation, one of each component is shown in FIG. 10.

The processor subsystem 72 can include any processing circuitry operative to control the operations and performance of the system 30. In various aspects, the processor subsystem 72 can be implemented as a general purpose processor, a chip multiprocessor (CMP), a dedicated processor, an embedded processor, a digital signal processor (DSP), a network processor, an input/output (I/O) processor, a media access control (MAC) processor, a radio baseband processor, a co-processor, a microprocessor such as a complex instruction set computer (CISC) microprocessor, a reduced instruction set computing (RISC) microprocessor, and/or a very long instruction word (VLIW) microprocessor, or other processing device. The processor subsystem 72 also can be implemented by a controller, a microcontroller, an application specific integrated circuit (ASIC), a field programmable gate array (FPGA), a programmable logic device (PLD), and so forth.

In various aspects, the processor subsystem 72 can be arranged to run an operating system (OS) and various applications. Examples of an OS comprise, for example, operating systems generally known under the trade name of Apple OS, Microsoft Windows OS, Android OS, Linux OS, and any other proprietary or open source OS. Examples of applications comprise, for example, network applications, local applications, data input/output applications, user interaction applications, etc.

In some embodiments, the system 30 can include a system bus 80 that couples various system components including the processing subsystem 72, the input/output subsystem 74, and the memory subsystem 76. The system bus 80 can be any of several types of bus structure(s) including a memory bus or memory controller, a peripheral bus or external bus, and/or a local bus using any variety of available bus architectures including, but not limited to, 9-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect Card International Association Bus (PCM-CIA), Small Computers Interface (SCSI) or other proprietary bus, or any custom bus suitable for computing device applications.

In some embodiments, the input/output subsystem 74 can include any suitable mechanism or component to enable a user to provide input to system 30 and the system 30 to provide output to the user. For example, the input/output subsystem 74 can include any suitable input mechanism, including but not limited to, a button, keypad, keyboard, click wheel, touch screen, motion sensor, microphone, camera, etc.

In some embodiments, the input/output subsystem 74 can include a visual peripheral output device for providing a display visible to the user. For example, the visual peripheral output device can include a screen such as, for example, a Liquid Crystal Display (LCD) screen. As another example, the visual peripheral output device can include a movable display or projecting system for providing a display of content on a surface remote from the system 30. In some embodiments, the visual peripheral output device can include a coder/decoder, also known as Codecs, to convert digital media data into analog signals. For example, the visual peripheral output device can include video Codecs, audio Codecs, or any other suitable type of Codec.

The visual peripheral output device can include display drivers, circuitry for driving display drivers, or both. The visual peripheral output device can be operative to display content under the direction of the processor subsystem 72. For example, the visual peripheral output device can be able to play media playback information, application screens for application implemented on the system 30, information regarding ongoing communications operations, information regarding incoming communications requests, or device operation screens, to name only a few.

In some embodiments, the communications interface 78 can include any suitable hardware, software, or combination of hardware and software that is capable of coupling the system 30 to one or more networks and/or additional devices. The communications interface 78 can be arranged to operate with any suitable technique for controlling information signals using a desired set of communications protocols, services or operating procedures. The communications interface 78 can include the appropriate physical connectors to connect with a corresponding communications medium, whether wired or wireless.

Vehicles of communication comprise a network. In various aspects, the network can include local area networks (LAN) as well as wide area networks (WAN) including without limitation Internet, wired channels, wireless channels, communication devices including telephones, computers, wire, radio, optical or other electromagnetic channels, and combinations thereof, including other devices and/or components capable of/associated with communicating data. For example, the communication environments comprise in-body communications, various devices, and various modes of communications such as wireless communications, wired communications, and combinations of the same.

Wireless communication modes comprise any mode of communication between points (e.g., nodes) that utilize, at least in part, wireless technology including various protocols and combinations of protocols associated with wireless transmission, data, and devices. The points comprise, for example, wireless devices such as wireless headsets, audio and multimedia devices and equipment, such as audio players and multimedia players, telephones, including mobile telephones and cordless telephones, and computers and computer-related devices and components, such as printers, network-connected machinery, and/or any other suitable device or third-party device.

Wired communication modes comprise any mode of communication between points that utilize wired technology including various protocols and combinations of protocols associated with wired transmission, data, and devices. The points comprise, for example, devices such as audio and multimedia devices and equipment, such as audio players and multimedia players, telephones, including mobile telephones and cordless telephones, and computers and computer-related devices and components, such as printers, network-connected machinery, and/or any other suitable device or third-party device. In various implementations, the wired communication modules can communicate in accordance with a number of wired protocols. Examples of wired protocols can include Universal Serial Bus (USB) communication, RS-232, RS-422, RS-423, RS-485 serial protocols, FireWire, Ethernet, Fibre Channel, MIDI, ATA, Serial ATA, PCI Express, T-1 (and variants), Industry Standard Architecture (ISA) parallel communication, Small Computer System Interface (SCSI) communication, or Peripheral Component Interconnect (PCI) communication, to name only a few examples.

Accordingly, in various aspects, the communications interface 78 can include one or more interfaces such as, for example, a wireless communications interface, a wired communications interface, a network interface, a transmit interface, a receive interface, a media interface, a system interface, a component interface, a switching interface, a chip interface, a controller, and so forth. When implemented by a wireless device or within wireless system, for example, the communications interface 78 can include a wireless interface comprising one or more antennas, transmitters, receivers, transceivers, amplifiers, filters, control logic, and so forth.

In various aspects, the communications interface 78 can provide data communications functionality in accordance with a number of protocols. Examples of protocols can include various wireless local area network (WLAN) protocols, including the Institute of Electrical and Electronics Engineers (IEEE) 802.xx series of protocols, such as IEEE 802.11a/b/g/n/ac, IEEE 802.16, IEEE 802.20, and so forth. Other examples of wireless protocols can include various wireless wide area network (WWAN) protocols, such as GSM cellular radiotelephone system protocols with GPRS, CDMA cellular radiotelephone communication systems with 1×RTT, EDGE systems, EV-DO systems, EV-DV systems, HSDPA systems, and so forth. Further examples of wireless protocols can include wireless personal area network (PAN) protocols, such as an Infrared protocol, a protocol from the Bluetooth Special Interest Group (SIG) series of protocols (e.g., Bluetooth Specification versions 5.0, 6, 7, legacy Bluetooth protocols, etc.) as well as one or more Bluetooth Profiles, and so forth. Yet another example of wireless protocols can include near-field communication techniques and protocols, such as electro-magnetic induction (EMI) techniques. An example of EMI techniques can include passive or active radio-frequency identification (RFID) protocols and devices. Other suitable protocols can include Ultra Wide Band (UWB), Digital Office (DO), Digital Home, Trusted Platform Module (TPM), ZigBee, and so forth.

In some embodiments, at least one non-transitory computer-readable storage medium is provided having computer-executable instructions embodied thereon, wherein, when executed by at least one processor, the computer-executable instructions cause the at least one processor to perform embodiments of the methods described herein. This computer-readable storage medium can be embodied in memory subsystem 76.

In some embodiments, the memory subsystem 76 can include any machine-readable or computer-readable media capable of storing data, including both volatile/non-volatile memory and removable/non-removable memory. The memory subsystem 76 can include at least one non-volatile memory unit. The non-volatile memory unit is capable of storing one or more software programs. The software programs can contain, for example, applications, user data, device data, and/or configuration data, or combinations therefore, to name only a few. The software programs can contain instructions executable by the various components of the system 30.

In various aspects, the memory subsystem 76 can include any machine-readable or computer-readable media capable of storing data, including both volatile/non-volatile memory and removable/non-removable memory. For example, memory can include read-only memory (ROM), random-access memory (RAM), dynamic RAM (DRAM), Double-Data-Rate DRAM (DDR-RAM), synchronous DRAM (SDRAM), static RAM (SRAM), programmable ROM (PROM), erasable programmable ROM (EPROM), electrically erasable programmable ROM (EEPROM), flash memory (e.g., NOR or NAND flash memory), content addressable memory (CAM), polymer memory (e.g., ferro-electric polymer memory), phase-change memory (e.g., ovonic memory), ferroelectric memory, silicon-oxide-nitride-oxide-silicon (SONOS) memory, disk memory (e.g., floppy disk, hard drive, optical disk, magnetic disk), or card (e.g., magnetic card, optical card), or any other type of media suitable for storing information.

In one embodiment, the memory subsystem 76 can contain an instruction set, in the form of a file for executing various methods, such as methods for generating a material-specific attenuation map and/or registration of an attenuation map to a second coordinate system, as described herein. The instruction set can be stored in any acceptable form of machine readable instructions, including source code or various appropriate programming languages. Some examples of programming languages that can be used to store the instruction set comprise, but are not limited to:

Java, C, C++, C#, Python, Objective-C, Visual Basic, or .NET programming. In some embodiments a compiler or interpreter is comprised to convert the instruction set into machine executable code for execution by the processing subsystem 72.

Each functional component described herein can be implemented in computer hardware, in program code, and/or in one or more computing systems executing such program code as is known in the art. As discussed above with respect to FIGS. 1 and 7, such a computing system can include one or more processing units which execute processor-executable program code stored in a memory system. Similarly, each of the disclosed methods and other processes described herein can be executed using any suitable combination of hardware and software. Software program code embodying these processes can be stored by any non-transitory tangible medium, as discussed above with respect to FIGS. 1 and 7.

Although the subject matter has been described in terms of exemplary embodiments, it is not limited thereto. Rather, the appended claims should be construed broadly, to include other variants and embodiments, which can be made by those skilled in the art.

What is claimed is:

1. A method of generating an attenuation map, comprising:

receiving computed tomography (CT) scan data for a CT scan including an imaging component, wherein the CT scan data comprises a plurality of voxels each having a scanned CT value;

identifying material in each voxel of the plurality of voxels by comparing the scanned CT value for the voxel with predetermined CT values for a plurality of materials related to a radiodensity of one of organic material or non-organic material and energy levels of the CT scan;

determining an image modality-specific voxel attenuation value for each voxel based on the predetermined CT value and an attenuation value for the identified one of the organic material or the non-organic material; and generating an attenuation map including the determined imaging modality-specific voxel attenuation value for each voxel, wherein the attenuation map is configured for attenuation correction of an imaging modality including the imaging component with a field of view of the imaging modality, modality-specific attenuation values, and energy-specific attenuation values.

2. The method of generating an attenuation map of claim 1, wherein the identified material of each voxel is a material in the plurality of materials having a predetermined CT value less than or equal to the scanned CT value for the voxel.

3. The method of generating an attenuation map of claim 1, wherein the voxel attenuation value for each voxel is determined based on a ratio of the scanned CT value for the voxel and the predetermined CT value for the identified material.

4. The method of generating an attenuation map of claim 3, wherein the voxel attenuation value for each voxel ($\mu_{voxel}$) is determined as:

$$\mu_{voxel} = \mu_{PET} \times \frac{\mu_{CT\ scanned}}{\mu_{CT\ material}}$$

where $\mu_{PET}$ is a predetermined attenuation value for the imaging modality at an expected energy, $\mu_{CT\ scanned}$ is the scanned CT value for the voxel, and $\mu_{CT\ material}$ is the predetermined CT value for the identified material.

5. The method of generating an attenuation map of claim 1, comprising registering the attenuation map to a coordinate system of the imaging modality.

6. The method of generating an attenuation map of claim 5, wherein registering the attenuation map comprises:

Receiving registration scan data for a registration scan including the imaging component within a field of view from the imaging modality;

Registering a position of the imaging component in the attenuation map to a position of the imaging component in the registration scan data.

7. The method of generating an attenuation map of claim 6, wherein the position of the imaging component in the attenuation map is registered to a position of the imaging component in the registration scan data using rigid or non-rigid body registration.

8. The method of generating an attenuation map of claim 1, wherein the CT scan data is received from a photon-counting CT system.

9. The method of generating an attenuation map of claim 1, wherein identifying a material in each voxel of the plurality of voxels comprises performing image recognition on the CT scan data.

10. The method of generating an attenuation map of claim 9, wherein the image recognition comprises clustering.

\*　　\*　　\*　　\*　　\*